(12) United States Patent
Nemiroff et al.

(10) Patent No.: US 8,510,107 B2
(45) Date of Patent: Aug. 13, 2013

(54) AUDIO DATA BIT RATE DETECTOR

(75) Inventors: Robert S. Nemiroff, Carlsbad, CA (US);
Jing Yang Chen, San Diego, CA (US);
Siu-Wai Wu, San Diego, CA (US)

(73) Assignee: General Instrument Corporation,
Horsham, PA (US)

( * ) Notice: Subject to any disclaimer, the term of this patent is extended or adjusted under 35 U.S.C. 154(b) by 752 days.

(21) Appl. No.: 12/620,762

(22) Filed: Nov. 18, 2009

(65) Prior Publication Data
US 2011/0119064 A1    May 19, 2011

(51) Int. Cl.
*G10L 21/04*    (2006.01)
(52) U.S. Cl.
USPC ........................................................ 704/229
(58) Field of Classification Search
USPC .................. 704/221–223, 229, 230, 500–504
See application file for complete search history.

(56) References Cited

U.S. PATENT DOCUMENTS

| | | | |
|---|---|---|---|
| 6,434,171 B1* | 8/2002 | Ishida | 370/537 |
| 7,630,366 B2* | 12/2009 | Iwase et al. | 370/389 |
| 2001/0055318 A1* | 12/2001 | Obata et al. | 370/474 |
| 2006/0034375 A1* | 2/2006 | Ward | 375/240.28 |
| 2006/0120466 A1* | 6/2006 | Yoshinari et al. | 375/259 |

OTHER PUBLICATIONS

IEC, "Digital Audio-Interface for Non-Linear PCM Encoded Audio Bitstreams applying IEC 60958" International Standard, First edition, Apr. 2000, CEI/IEC 61937:2000.

* cited by examiner

*Primary Examiner* — Abul Azad
(74) *Attorney, Agent, or Firm* — Thomas A. Ward

(57) ABSTRACT

A detector for determining an audio data bit rate of a pre-compressed audio elementary stream (AES), in which the pre-compressed AES includes a plurality of preamble length fields is provided. The detector includes an analyzer module configured to determine one or more candidate audio data bit rates of the AES from the plurality of preamble length fields, a detector module configured to determine whether one or more of the candidate audio data bit rates are correct, and a selector module configured to select one of the one or more candidate audio data bit rates determined to be correct as the audio data bit rate of the pre-compressed AES.

14 Claims, 5 Drawing Sheets

AUDIO DATA BIT RATE DETECTOR

BACKGROUND

Advanced Video Coding (AVC) and Motion Picture Expert Group (MPEG) encoders transport one or more compressed audio elementary streams (AESs) into a multiplexer that outputs the compressed AESs. The encoders typically compress the audio from raw Pulse Code Modulation (PCM) samples or pass through audio from a pre-compressed AES. The pre-compressed AES is typically input to the encoder under Audio Engineering Society-European Broadcasting Union (AES-EBU) standards or is embedded in the video elementary stream through the Society of Motion Picture and Television Engineers (SMPTE) 339 standard. When the audio is pre-compressed, the AES has previously been compressed at one of several different audio data bit rates. As such, the encoders are required to obtain bit rates of the pre-compressed AES to identify how much data to extract from the pre-compressed AES and to multiplex and transmit the audio packets.

In one current method, the encoder reads the length field from the SMPTE 339 packet to determine how much data to extract from the AES. Oftentimes, however, the AES is corrupted due to poor signal quality or an input switchover. The length field is also typically corrupted in these instances, which often causes the data transfer to the multiplexer to overflow and the audio data bit rate to exceed an expected rate.

Multiplexers typically transmit each Packetized Elementary Stream (PES) based on a time schedule. If the pre-compressed audio data bit rate changes while the AES is transported to the multiplexer, the PES size will also change. However, the time schedule for transmissions of each PES will remain the same. If there is a corruption in the preamble length fields in the pre-compressed AES, an incorrect amount of data will be sent to the multiplexer. More particularly, if the audio data bit rate sent to the multiplexer is greater than the maximum audio data bit rate, the audio data sent to the multiplexer will overflow. This is likely to cause a non-recoverable error since the write pointer overruns the read pointer in the buffer from the extracted AES to the multiplexer.

SUMMARY

Disclosed herein is a detector for determining an audio data bit rate of a pre-compressed audio elementary stream (AES), in which the pre-compressed AES includes a plurality of preamble length fields. The detector includes an analyzer module configured to determine one or more candidate audio data bit rates of the AES from the plurality of preamble length fields, a detector module configured to determine whether one or more of the candidate audio data bit rates are correct, and a selector module configured to select one of the one or more candidate audio data bit rates determined to be correct as the audio data bit rate of the pre-compressed AES.

Also disclosed herein is a method for determining an audio data bit rate of a pre-compressed audio elementary stream (AES), in which the pre-compressed AES includes a plurality of preamble length fields. In the method, one or more candidate audio data bit rates of the pre-compressed AES are determined through an analysis of the plurality of preamble length fields. In addition, a determination as to whether the one or more candidate audio data bit rates are correct is made and one of the one or more candidate audio data bit rates determined to be correct s selected as the audio data bit rate for use in extracting the pre-compressed AES.

Further disclosed is a computer readable storage medium on which is embedded one or more computer programs for implementing the method for determining an audio data bit rate of a pre-compressed audio elementary stream (AES).

Through implementation of the method and detector disclosed herein, a seamless switch over of an AES may automatically be acquired. In addition, the correct audio data bit rate of a pre-compressed AES may be detected in a relatively efficient manner and with error resilience. Therefore, seamless audio data bit rate changes may be accomplished for one or more pre-compressed AESs passing through an encoder.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a method and detector for determining an audio data bit rate of a pre-compressed audio elementary stream (AES). More particularly, the method and detector disclosed herein are configured to determine which of one or more candidate audio data bit rates is correct for the pre-compressed AES and to communicate the determined correct audio data bit rate to an AES extractor and a multiplexer for their use and further processing of the pre-compressed AES.

Figure 1:
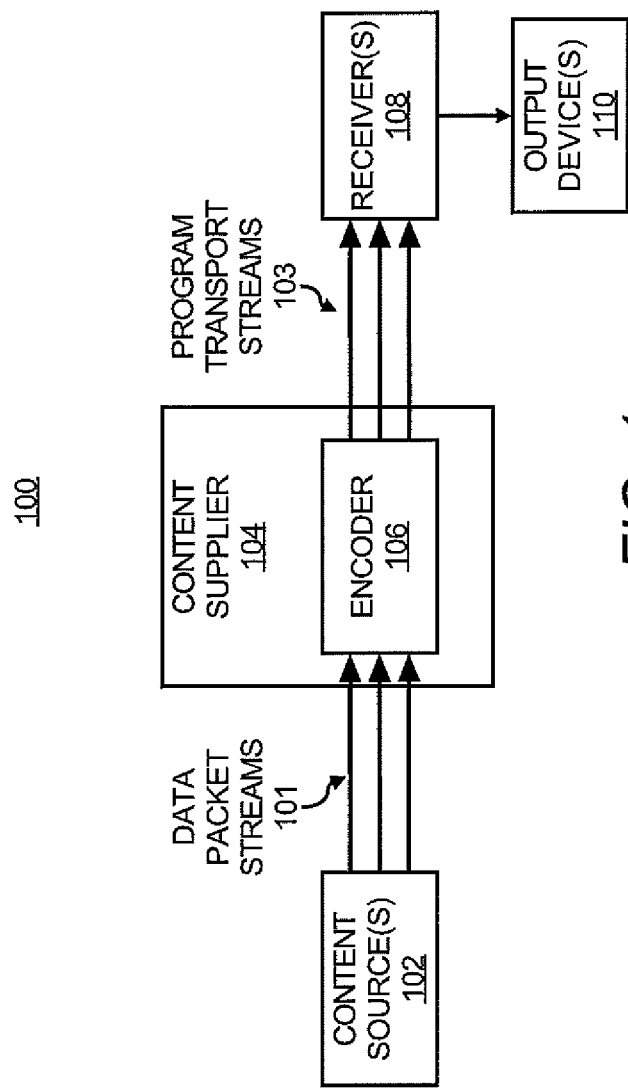
FIG. 1 shows a block diagram of a content transmission system, according to an embodiment of the present invention.

With reference to FIG. 1, there is shown a block diagram of a content transmission system 100, according to an embodiment of the present invention. It should be apparent to those of ordinary skill in the art that the block diagram of FIG. 1 represents a generalized illustration and that other components may be added or existing components may be removed, modified or rearranged without departing from a scope of the content transmission system 100.

The content transmission system 100 is depicted as including one or more content sources 102, a content supplier 104, one or more receivers 108, and one or more output devices 110. The content source(s) 102 may comprise a direct source of content, such as, a network television broadcast provider, a cable television broadcast provider, etc. In addition, the content may comprise the programming offered by the content source(s) to be broadcast to users. The content source(s) 102 is configured to communicate data packet streams 101 containing the content to the content supplier 104. The data packet streams 101 may include embedded audio elementary streams (AESs), which have been pre-compressed prior to communication of the data packet streams 101 to the content supplier 104. By way of example, the pre-compressed AESs may be communicated to the content supplier 104 by either AES-EBU or the pre-compressed AESs may be embedded in video streams through, for instance, the SMPTE 339 standard. As discussed in greater detail herein below, the content supplier 104 includes an encoder 106 configured to detect and select an audio data bit rate of the AESs in the data packet streams 101 for use in extracting the AESs from the data packet streams 101.

The content source(S) 102 are configured to communicate the data packet streams 101 to the content supplier 104 through any suitable communication channel. Suitable communication channels include, for instance, communication channels over satellites, land-line based communications, etc. As such, although not explicitly depicted in FIG. 1, additional components may be positioned between the content source(s) 102 and the content supplier 104 to enable the communications.

The content supplier 104 may comprise a cable television provider, a satellite television provider, etc., a head-end of a cable television provider, or the like. As such, the content supplier 104 is configured to receive the data packet streams 101 from the content source(s) 102 and to communicate the content to one or more end users for consumption through the receiver(s) 108. The content supplier 104 includes an encoder 106 configured to encode the data packet streams 101 into program transport streams 103, which are communicated to the receiver(s) 108. The program transport streams 103 may include audio and/or video data or information, such as streamed audio services, streamed video services, and streamed data services or files.

In one regard, the receivers 108 are devices used to access content provided by the content supplier 104, which content the user has authorization to access. Examples of receivers 108 include, but are not limited to CATV set-top boxes, satellite-TV receivers, personal computer, mobile handsets, portable media players, etc. The receivers 108 may also output the received content for consumption through one or more output devices 110, which may include televisions, monitors, speakers, etc.

The encoder 106 may use different encoding standards to encode different program transport streams. The different encoding standards for digital audio and video files may include different Motion Picture Expert Group (MPEG) standards, such as MPEG2 and MPEG4 standards. The different encoding standards for digital audio file may include, MP3, Advanced Audio Coding (AAC) and Dolby Digital Plus (DDP).

Figure 2:
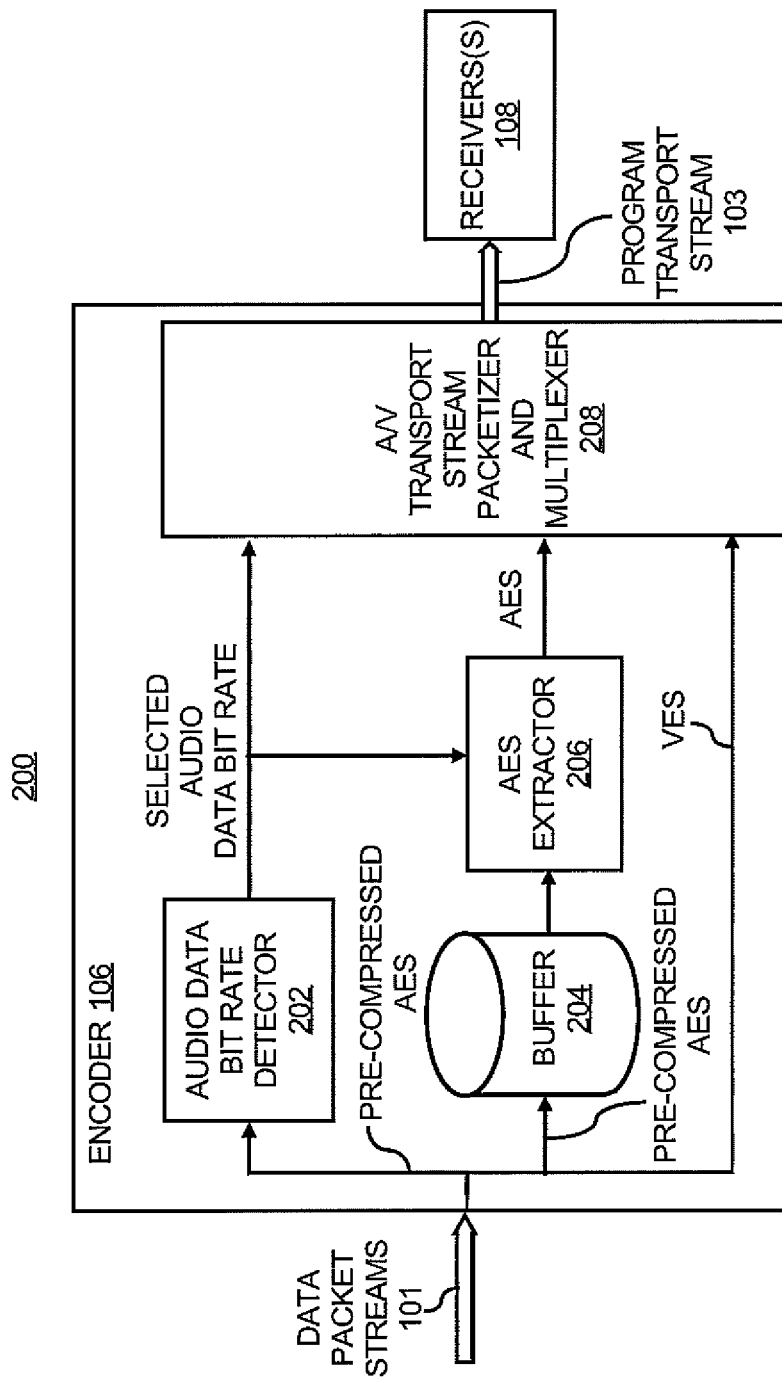
FIG. 2 shows a block diagram of an encoder depicted in the content transmission system of FIG. 1, according to an embodiment of the present invention.

With particular reference now to FIG. 2, there is shown a block diagram 200 of the encoder 106, according to an embodiment. It should be apparent to those of ordinary skill in the art that the block diagram 200 of the encoder 106 represents a generalized illustration and that other components may be added or existing components may be removed, modified or rearranged without departing from a scope of the encoder 106.

The encoder 106 is depicted as including an audio data bit detector 202, a buffer 204, an audio elementary stream (AES) extractor 206, and an audio/video (NV) transport stream packetizer and multiplexer 208. The encoder 106 may comprise software stored on a computer readable storage medium, a hardware apparatus, such as a circuit, or a combination of software and hardware components.

In instances where the encoder 106 comprises software, the encoder 106 may be executed or implemented by a computing device processor (not shown). In these instances, the components 202-208 may comprise software modules or other programs or algorithms configured to perform the functions described herein below. In instances where the encoder 106 comprises firmware and/or hardware, the encoder 106 may comprise a circuit or other device configured to perform the functions described herein below. In other instances, the components 202-208 may comprise a combination of software modules and hardware modules.

As shown in FIG. 2, the data packet streams 101 are composed of AESs and video elementary streams (VESs). According to a particular example, the AES comprises a pre-compressed AES that is embedded in the video stream. The pre-compressed AES may be embedded in the video stream through, for instance, the SMPTE 339 standard. Alternatively, the pre-compressed AES is input to the encoder 102 through application of the AES-EBU standard.

In any regard, the audio data bit rate detector 202 receives the pre-compressed AES, selects a correct audio data bit rate for the pre-compressed AES, and outputs the selected audio data bit rate to the AES extractor 206 and the multiplexer 208. The pre-compressed AES is also stored in the buffer 204 while the audio data bit rate detect or 202 determines and selects the correct audio data bit rate. In addition, the AES extractor 206 is depicted as receiving the pre-compressed AES from the buffer in the selected correct audio data bit rate from the audio data bit rate detect or 202 and implementing the selected audio data bit rate in extracting the AES from the pre-compressed AES.

The A/V transport stream packetizer and multiplexer 208 is also depicted as receiving the extracted AES from the AES extractor 206 and the selected audio data bit rate from the audio data rate detector 202. The A/V transport stream packetizer and multiplexer 208 is further depicted as using the selected audio data bit rate to multiplex and transmit the extracted AES and the VES. According to an embodiment, the A/V transport stream packetizer and multiplexer 208 is configured to packetize and multiplex the AES and VES as a packetized elementary stream (PES). PES is a specification defined by the MPEG communication protocol that allows an elementary stream to be divided into packets. The elementary stream is packetized by encapsulating sequential data bytes from the elementary stream inside PES packet headers. A method of transmitting audio and video elementary stream data from the apparatus 104 is to create PES packets from the audio and video elementary stream data and then to encapsulate these PES packets inside transport stream (TS) packets.

Figure 3:
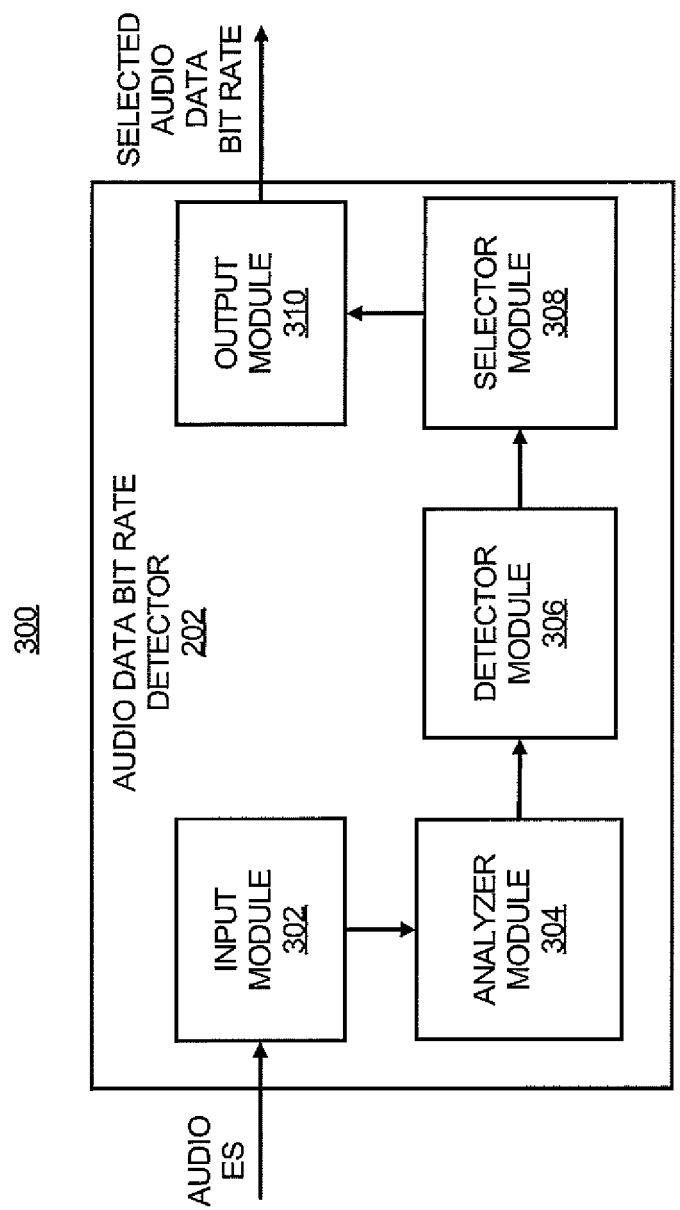
FIG. 3 illustrates a block diagram of the audio data bit rate detector depicted in the encoder of FIG. 2, according to an embodiment of the present invention.

Various manners in which the audio data bit rate detector 202 determines and selects the correct audio data bit rate for the pre-compressed AES are discussed in greater detail here and below with respect to FIGS. 3 and 4. With reference first to FIG. 3, there is shown a block diagram 300 of the audio data bit rate detector 202, according to an embodiment. It should be apparent to those of ordinary skill in the art that the block diagram 300 of the audio data rate and extractor 202 represents a generalized illustration and that other components may be added or existing components may be removed, modified or rearranged without departing from a scope of the audio data rate and extractor 202.

As shown in FIG. 3, the audio data bit rate detector 202 includes an input module 302, and analyzer module 304, a detector module 306, a selector module 308, and an output module 310. As discussed above, the audio data bit rate detector 202 may comprise software and/or hardware. As such, the modules 302-310 may comprise software modules, hardware modules, or a combination of software and hardware modules. Thus, in one embodiment, one or more of the modules 302-310 comprise circuit components. In another embodiment, one or more of the modules 302-310 comprise software code stored on a computer readable storage medium, which is executable by a processor.

Figure 4:
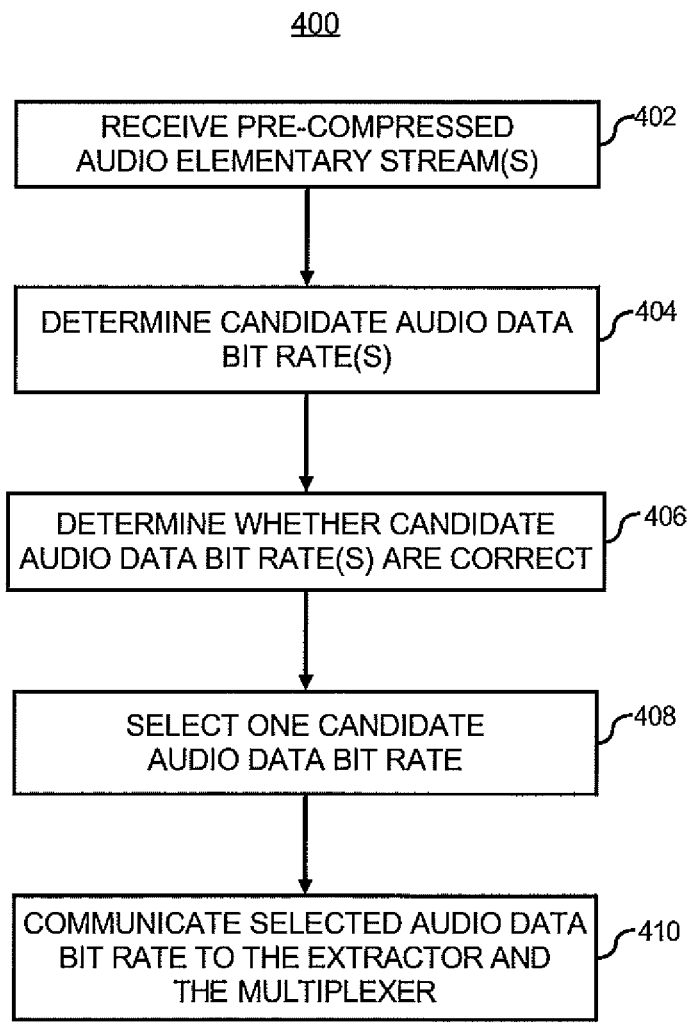
FIG. 4 illustrates a flowchart of a method for determining an audio data bit rate of a pre-compressed audio elementary stream, according to an embodiment of the present invention.

Various manners in which the modules 302-310 of the audio data bit rate detector 202 may be implemented is described in greater detail with respect to FIG. 4, which depicts a flow diagram of a method 400 for determining an audio data bit rate of a pre-compressed audio elementary stream (AES), according to an embodiment. It should be apparent to those of ordinary skill in the art that the method 400 represents a generalized illustration and that other steps may be added or existing steps may be removed, modified or rearranged without departing from a scope of the method 400.

As shown therein, at step 402, one or more pre-compressed AESs are received, for instance, through the input module 302. As discussed above, the pre-compressed AES(s) may be obtained from the data packet streams 101. In addition, the pre-compressed AESs have preamble length fields, which identifies the amount of data to be extracted from the pre-compressed AES. A more detailed discussion of preamble length fields may be found in the International Standard IEC 61937, entitled "Digital Audio—Interface for non-linear PCM encoded audio bitstreams applying IEC 60958", the disclosure of which is hereby incorporated by reference in its entirety.

At step 404, one or more candidate audio data bit rates of the pre-compressed AES is determined through an analysis of the plurality of preamble length fields, for instance, by the analyzer module 304. More particularly, for instance, the analyzer module 304 is configured to analyze the preamble length fields in the pre-compressed AES data packet to identify the plurality of candidate audio data bit rates. The preamble length fields in the pre-compressed AES may indicate a number of different audio data bit rates, for instance, if the video and/or audio contained in the data packet streams 101 contains noise or are otherwise corrupted.

At step 406, a determination as which, if any, of the candidate audio data bit rates are correct, for instance, by the detector module 306. According to an embodiment, the detector module 306 is configured to determine that a candidate audio data bit rate is correct when a predetermined number of preamble length fields in a row contain the same number with respect to each other and the same number matches an expected length field value.

At step 408, one of the one or more candidate audio data bit rates determined to be correct is selected as the audio data bit rate of the pre-compressed AES, for instance, by the selector module 308. More particularly, for instance, the selector module 308 may determine the audio data bit rate that meets the criteria discussed above at step 406 for a particular time sequence. In addition, the selector module 308 may determine the audio data bit rate that meets the criteria discussed above for another particular time sequence. As such, the selected audio data bit rate may accurately correspond to the actual audio data bit rates of the pre-compressed AESs. According to an example, if the selector module 308 determines that none of the candidate audio data bit rates determined over any time sequence is correct, the selector module 308 may maintain a previously selected audio data bit rate as the audio data bit rate for the pre-compressed AES over that time sequence.

At step 410, the selected audio data bit rate is communicated to the AES extractor 206 and the A/V transport stream packetizer and multiplexer 208, for instance, by the output module 310. As discussed above, the AES extractor 206 is configured to implement the selected audio data bit rate to correctly extract the pre-compressed AES. In addition, the A/V transport stream packetizer and multiplexer 208 is configured to use the selected audio data bit rate to correctly packetize and multiplex the extracted AES with a video elementary stream. According to an embodiment, the output module is configured to cause communication of the selected audio data bit rate to the multiplexer to cease in response to a correct audio data bit rate failing to be determined.

Some or all of the operations set forth in the method 400 may be contained as a utility, program, or subprogram, in any desired computer accessible medium. In addition, the method 300 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
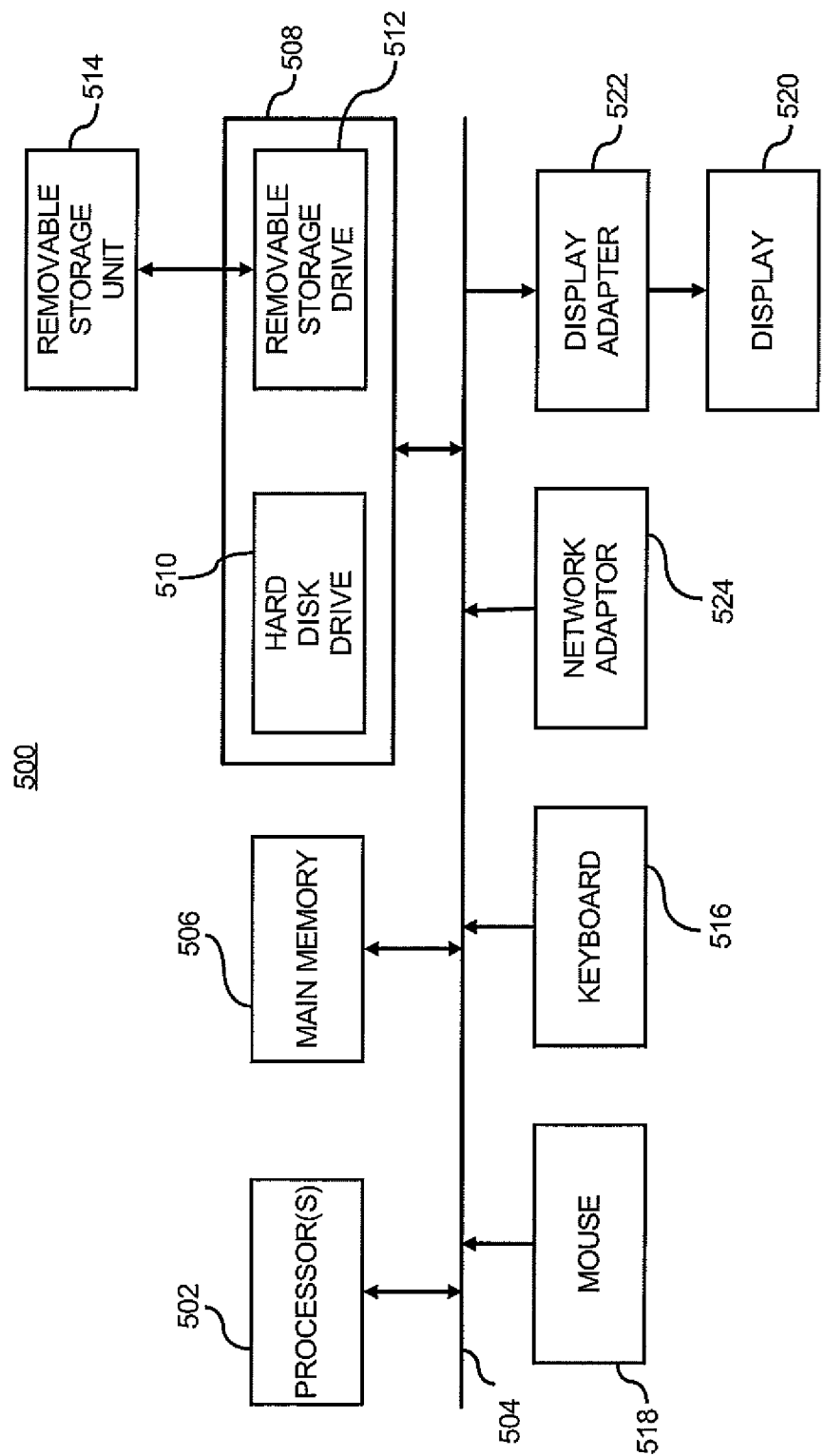
FIG. 5 shows a block diagram of a computing apparatus configured to implement or execute the audio bit rate detector individually or as part of the encoder depicted in FIGS. 1-3, according to an embodiment of the present invention.

FIG. 5 illustrates a block diagram of a computing apparatus 500 configured to implement or execute the audio data bit rate detector 202 individually or as part of the encoder 106 operations, according to an embodiment. In this respect, the computing apparatus 500 may be used as a platform for executing one or more of the functions described hereinabove with respect to the audio data bit rate detector 202 and/or the encoder 106.

The computing apparatus 500 includes a processor 502 that may implement or execute some or all of the steps described in the method 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the method 400 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

Through implementation of the method and detector disclosed herein, a seamless switch over of an AES may automatically be acquired. In addition, the correct audio data bit rate of a pre-compressed AES may be detected in a relatively efficient manner and with error resilience. Therefore, seamless audio data bit rate changes may be accomplished for one or more pre-compressed AESs passing through an encoder.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A detector for determining an audio data bit rate of a pre-compressed audio elementary stream (AES), wherein the pre-compressed AES includes a plurality of preamble length fields, said detector comprising:
   an analyzer module configured to determine one or more candidate audio data bit rates of the AES from the plurality of preamble length fields by computing the one or more candidate audio data bit rates for different ones of the plurality of preamble length fields;
   a detector module configured to determine whether one or more of the candidate audio data bit rates are correct when a predetermined number of preamble length fields in a row contain the same number with respect to each other and the same number matches an expected length field value; and
   a selector module configured to select one of the one or more candidate audio data bit rates determined to be correct as the audio data bit rate of the pre-compressed AES.

2. The detector according to claim 1, wherein the analyzer module is further configured to determine the one or more candidate audio data bit rates over a time sequence, and wherein the detector module is further configured to determine whether the one or more audio data bit rates identified over the time sequence are correct.

3. The detector according to claim 2, wherein the detector module is further configured to determine whether one or more candidate audio data bit rates determined over another time sequence are correct and to maintain a previously selected audio data bit rate in response to a determination that the one or more candidate audio data bit rates determined over the another time sequence are incorrect.

4. The detector according to claim 1, further comprising:
   an output module configured to communicate the selected audio data bit rate to an AES extractor, wherein the AES extractor is configured to implement the selected audio data bit rate in extracting the pre-compressed AES.

5. The detector according to claim 4, wherein the output module is further configured to communicate the selected audio data bit rate to a multiplexer, wherein the multiplexer is configured to implement the selected audio data bit rate in multiplexing the extracted AES and a video elementary stream.

6. The detector according to claim 5, wherein the output module is further configured to cause communication of the selected audio data bit rate to the multiplexer to cease in response to a correct audio data bit rate failing to be determined.

7. The detector according to claim 5, wherein a portion of the pre-compressed AES is stored in a buffer while the one or more candidate audio data bit rates are determined and one of the candidate audio data bit rates is selected.

8. A method for determining an audio data bit rate of a pre-compressed audio elementary stream (AES), wherein the pre-compressed AES includes a plurality of preamble length fields, said method comprising:
   determining one or more candidate audio data bit rates of the pre-compressed AES by computing the one or more candidate audio bit rates for different ones of the plurality of preamble length fields;
   determining whether the one or more candidate audio data bit rates are correct when a predetermined number of preamble length fields in a row contain the same number with respect to each other and the same number matches an expected length field value; and
   selecting one of the one or more candidate audio data bit rates determined to be correct as the audio data bit rate for use in extracting the pre-compressed AES.

9. The method according to claim 8, wherein determining the one or more candidate audio data bit rates further comprises determining the one or more candidate audio data bit rates over a time sequence, and wherein determining whether the one or more candidate audio data bit rates are correct further comprises determining whether the one or more audio data bit rates identified over the time sequence are correct.

10. The method according to claim 9, further comprising:
    determining whether one or more candidate audio data bit rates determined over another time sequence are correct; and
    maintaining a previously selected audio data bit rate in response to a determination that the one or more candidate audio data bit rates determined over the another time sequence are incorrect.

11. The method according to claim 8, further comprising:
    communicating the selected audio data bit rate to an AES extractor, wherein the AES extractor is configured to implement the selected audio data data bit rate in extracting the pre-compressed AES.

12. The method according to claim 11, further comprising:
    communicating the selected audio data bit rate to a multiplexer, wherein the multiplexer is configured to implement the selected audio data bit rate in multiplexing the extracted AES and a video elementary stream.

13. The method according to claim 11, further comprising:
    storing a portion of the pre-compressed AES in a buffer while the audio data bit rate is selected prior to the AES extractor in extracting the pre-compressed AES.

14. A non-transitory computer readable storage medium on which is embedded one or more computer programs, said one or more computer programs implementing a method for processing audio data, said one or more computer programs comprising a set of instructions for:
    receiving an pre-compressed audio elementary stream (AES), wherein the pre-compressed AES includes a plurality of preamble length fields;
    determining one or more candidate audio data bit rates of the AES by computing the one or more candidate audio bit rates for different ones of the plurality of preamble length fields;
    determining whether the one or more candidate audio data bit rates are correct when a predetermined number of preamble length fields in a row contain the same number with respect to each other and the same number matches an expected length field value; and selecting one of the one or more candidate audio data bit rates determined to be correct as the audio data bit rate for use in extracting the pre-compressed AES.

* * * * *